United States Patent
Walsh et al.

(10) Patent No.: US 11,550,658 B1
(45) Date of Patent: Jan. 10, 2023

(54) STORAGE SYSTEM AND METHOD FOR STORING LOGICAL-TO-PHYSICAL ADDRESS TABLE ENTRIES IN A CODEWORD IN VOLATILE MEMORY

(71) Applicant: Western Digital Technologies, Inc., San Jose, CA (US)

(72) Inventors: James J. Walsh, Santa Clara, CA (US); Stephen Gold, Fort Collins, CO (US); David R. Meyer, Lakewood, CO (US); Vivek Shivhare, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/465,165

(22) Filed: Sep. 2, 2021

(51) Int. Cl.
G11C 29/00 (2006.01)
G06F 11/10 (2006.01)
G06F 12/02 (2006.01)
G06F 13/16 (2006.01)

(52) U.S. Cl.
CPC ...... G06F 11/1068 (2013.01); G06F 12/0238 (2013.01); G06F 12/0292 (2013.01); G06F 13/1678 (2013.01); G06F 2212/7201 (2013.01)

(58) Field of Classification Search
CPC ............. G06F 11/1068; G06F 12/0238; G06F 12/0292; G06F 13/1678; G06F 2212/7201
See application file for complete search history.

(56) References Cited

U.S. PATENT DOCUMENTS

| | | | |
|---|---|---|---|
| 9,026,887 B2 | 5/2015 | Manning et al. | |
| 9,116,824 B2 | 8/2015 | Sharon et al. | |
| 9,430,326 B2 | 8/2016 | Barndt | |
| 10,459,786 B2 | 10/2019 | Higgins et al. | |
| 2015/0261797 A1* | 9/2015 | Alcantara | G06F 3/061 707/813 |

OTHER PUBLICATIONS

Yeleswarapu, R. et al.; "SSCMSD—Single-Symbol Correction Multi-Symbol Detection for DRAM subsystem"; IEEE Computer Society; 2018 IEEE 23$^{rd}$ Pacific Rim International Symposium on Dependable Computing (PRDC); Dec. 4, 2018; pp. 15-24.

* cited by examiner

*Primary Examiner* — Samir W Rizk
(74) *Attorney, Agent, or Firm* — Crowell & Moring LLP (57) ABSTRACT

A storage system caches logical-to-physical address table entries read in volatile memory. The logical-to-physical address table entries are stored in codewords. The storage system can vary a number or size of an entry in a codeword. Additionally or alternatively, each codeword can store both complete and partial logical-to-physical address table entries. In one example, a codeword having 62 bytes of data and two bytes of error correction code stores 15 complete logical-to-physical address table entries and one partial logical-to-physical address table entry, where the remainder of the partial entry is stored in another codeword. This configuration strikes a good balance between storage space efficiency and random-access write performance.

20 Claims, 9 Drawing Sheets

|  | Capacity (GB) | Usable DRAM Capacity (GiB) | Raw DRAM Capacity |  | Total User DRAM Needed | Including ECC (MiB) | DRAM +/- (GiB) |
|---|---|---|---|---|---|---|---|
| Total Used Dram | 960 | 1 | 1 |  | 1160.1 | 1095.0 | -0.069 |
| | 1920 | 2 | 2 |  | 2069.0 | 2018.1 | 0.029 |
| | 3840 | 4 | 4 |  | 3886.8 | 3864.3 | 0.226 |
| | 7680 | 8 | 8 |  | 7522.4 | 7556.7 | 0.620 |
| | 15360 | 16 | 16 |  | 15240.7 | 15463.4 | 0.899 |
| | 30720 | 32 | 32 |  | 31124.4 | 31755.0 | 0.969 |
| | 61440 | 64 | 64 |  | 63786.0 | 65263.1 | 0.266 |

STORAGE SYSTEM AND METHOD FOR STORING LOGICAL-TO-PHYSICAL ADDRESS TABLE ENTRIES IN A CODEWORD IN VOLATILE MEMORY

BACKGROUND

In some storage environments, a host provides a logical address for a read or write command to a storage system, and the storage system consults a logical-to-physical address translation table to identify a physical address of non-volatile memory associated with the logical address. The table is stored in the non-volatile memory, but some or all of the table can be cached in volatile memory for faster access. Error correction code can be generated based on the cached table and stored in the volatile memory.

DETAILED DESCRIPTION

The following embodiments are generally related to a storage system and method for storing logical-to-physical address table entries in a codeword in volatile memory. In one embodiment, a storage system is provided comprising a non-volatile memory; a volatile memory; means for reading a codeword from the volatile memory, wherein the codeword comprises a data portion and an error correction code generated from the data portion, and wherein the data portion comprises at least one logical-to-physical address table entry read from the non-volatile memory; and means for varying a number or size of the at least one logical-to-physical table entry in the codeword. In another embodiment, a storage system is provided comprising a non-volatile memory, a volatile memory, and a controller. The controller is configured to store first and second codewords in the volatile memory. The data payload of the first codeword comprises a first logical-to-physical address table entry read from the non-volatile memory and a portion of a second logical-to-physical address table entry read from the non-volatile memory, and the data payload of the second codeword comprises a remainder of the second logical-to-physical address table entry. In yet another embodiment, a method is provided comprising storing a codeword in volatile memory, wherein the codeword comprises a data portion and an error correction code generated from the data portion, wherein the data portion comprises a complete logical-to-physical address table entry read from the non-volatile memory and a partial logical-to-physical address table entry read from the non-volatile memory; and storing at least one additional codeword in the volatile memory, wherein the at least one additional codeword comprises a remainder of the partial logical-to-physical address table entry. Other embodiments are provided, and each of these embodiments can be used alone or in combination.

Figures 1A, 1B:
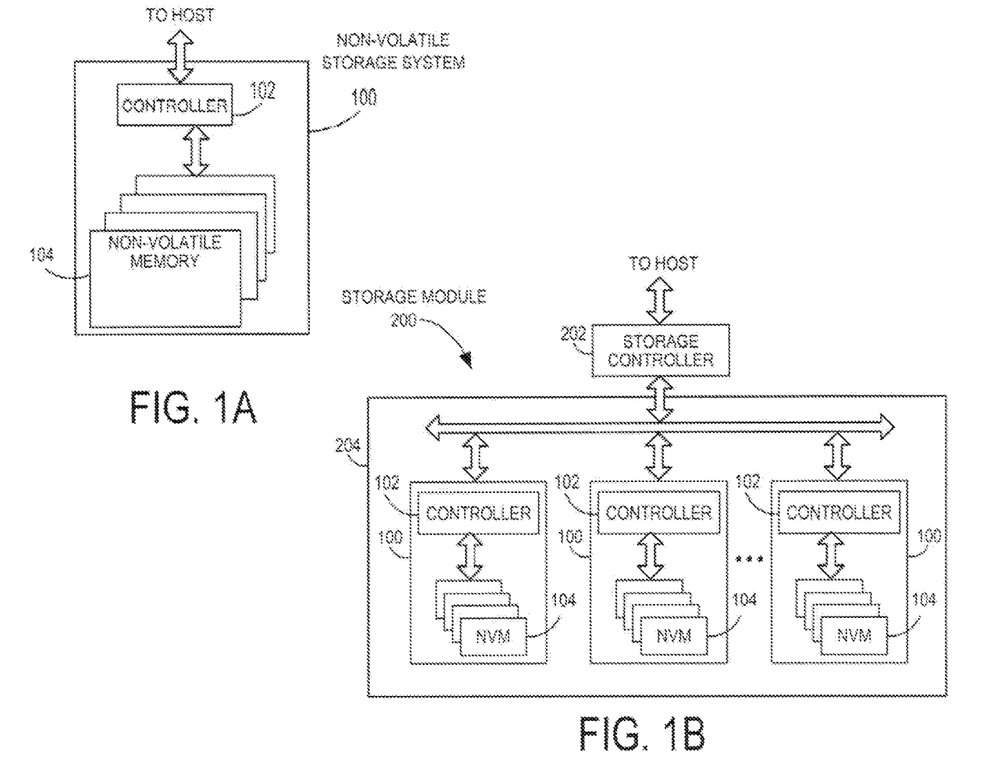
FIG. 1A is a block diagram of a non-volatile storage system of an embodiment.
FIG. 1B is a block diagram illustrating a storage module of an embodiment.
Figure 1C:
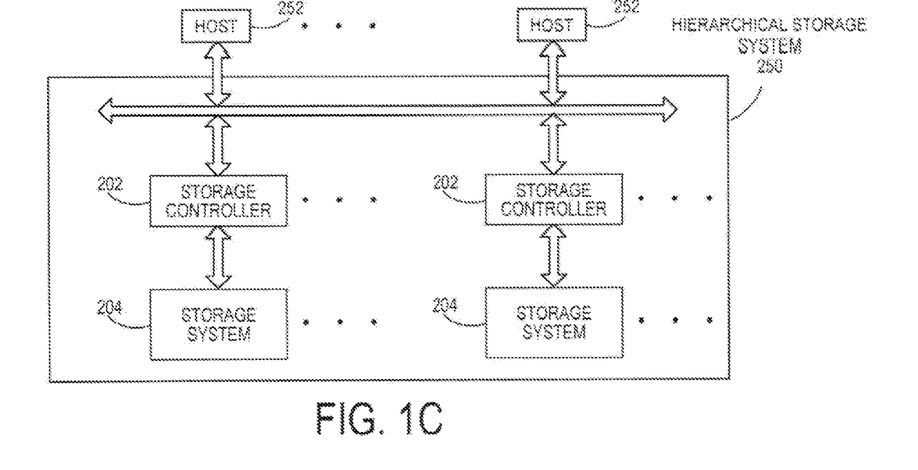
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

In one embodiment, the controller 102 is a NAND memory controller (e.g., for an SSD). In other embodiments, the controller 102 can be another type of non-volatile memory controller (e.g., a flash, resistive random-access memory (ReRAM), phase-change memory (PCM), or magnetoresistive random-access memory (MRAM) controller)). (It should be noted that ReRAM and MRAM are direct random-access write media, so they may not have a logical-to-physical address table stored in DRAM, which is relevant to the below discussion.) Also, the controller 102 can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
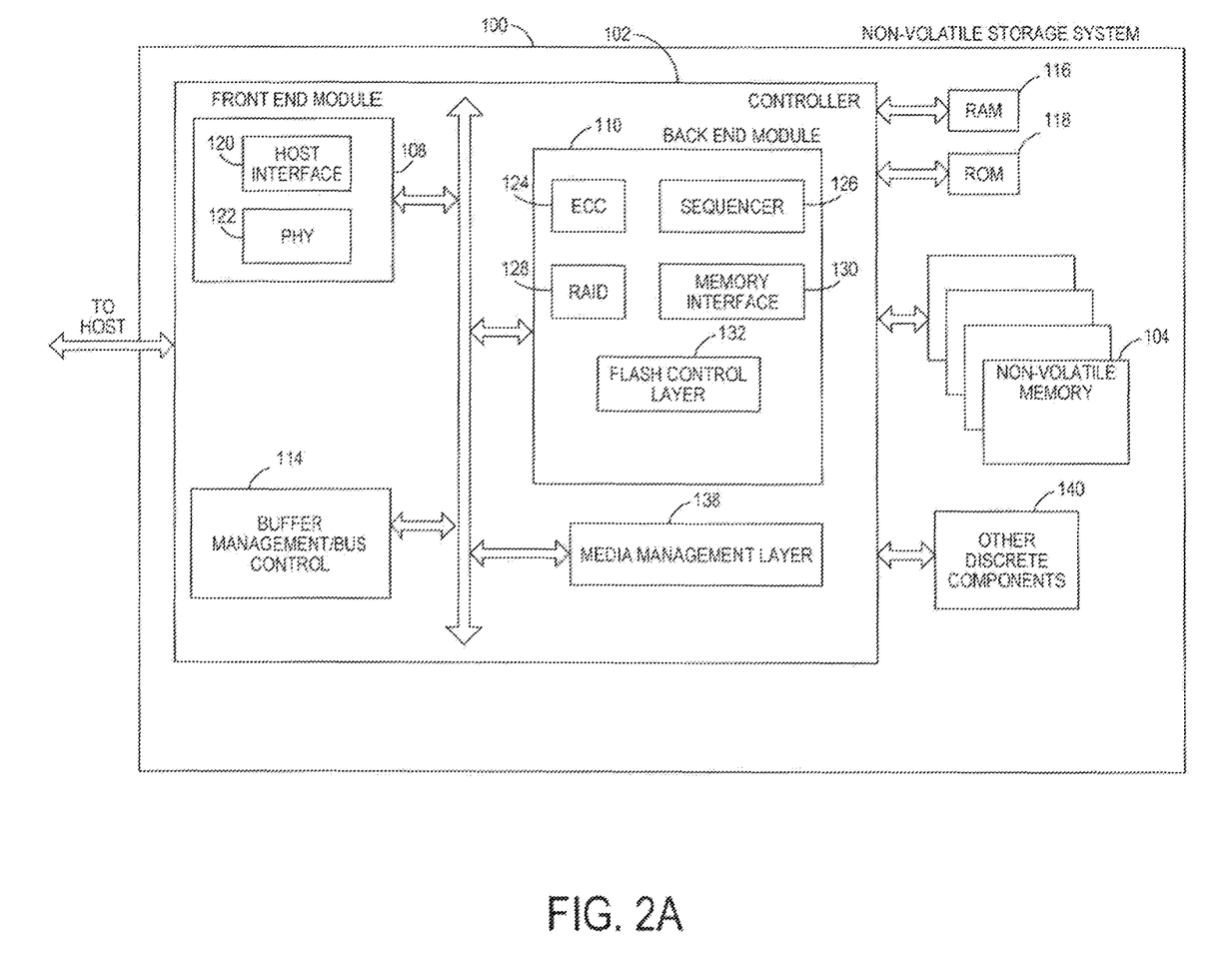
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR)

interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
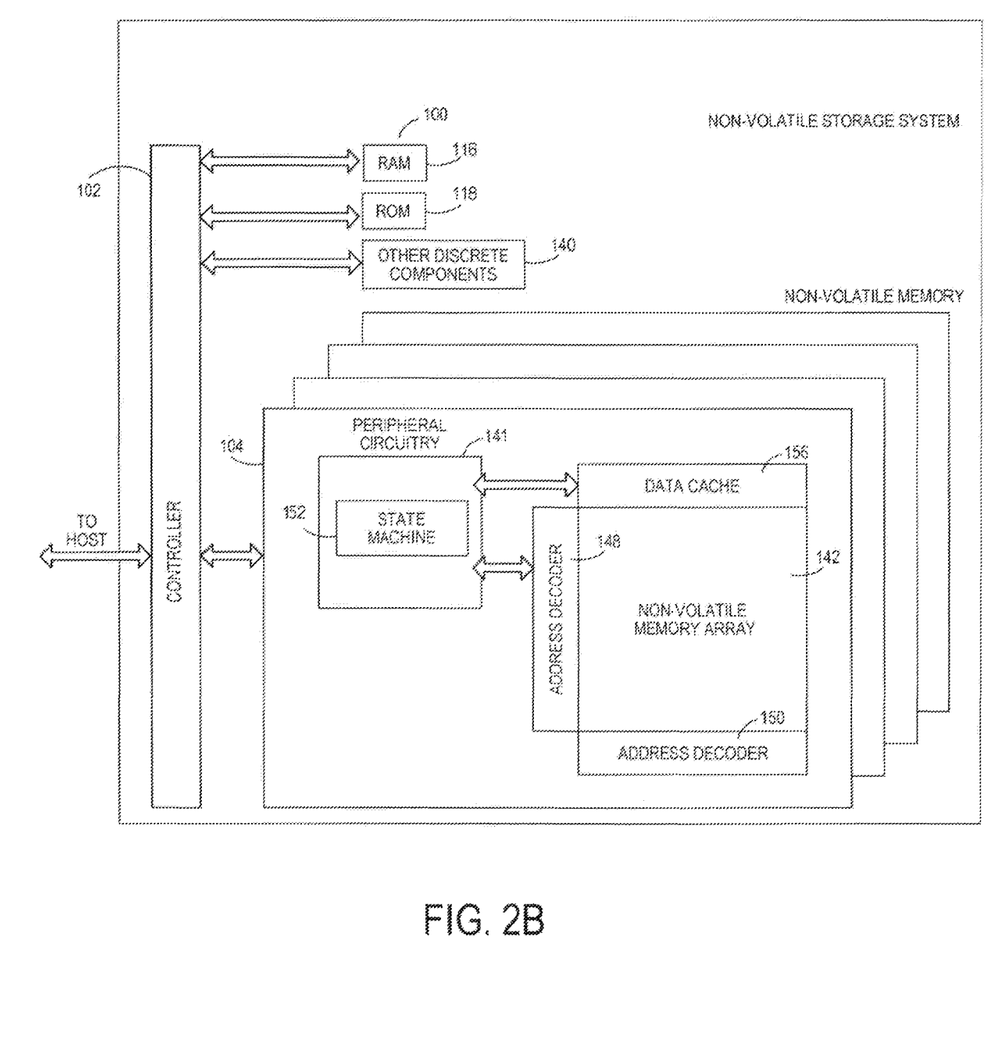
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
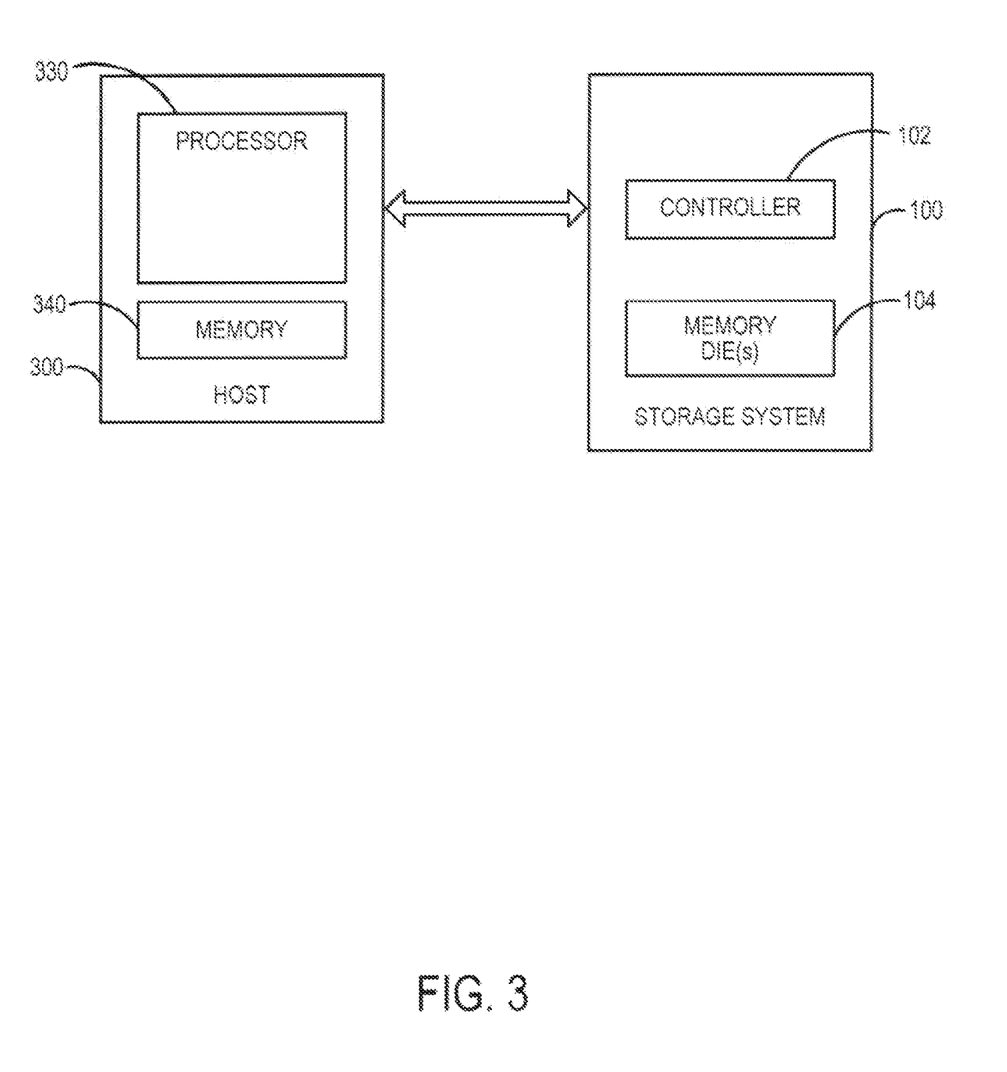
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

As mentioned above, the storage system 100 can store logical blocks of data in the non-volatile memory 104 (e.g., NAND). In operation, data is provided by the host 300, which addresses each logical block of data with a logical block address. Because the memory 104 can be lossy, the controller 102 of the storage system 100 can store logical blocks of data at various physical locations (physical addresses) in the memory 104. The mapping from logical block address to physical address is stored in a table referred to herein as a logical-to-physical address table ("L2P table") or map. When the host 300 reads a particular logical block address, the controller 102 looks up the physical address in the L2P table by reading the entry in the table that corresponds to the logical block address. Then, the controller 102 reads the logical block data from the memory 104 and sends it to the host 300.

L2P tables can be large, and reading the L2P table from the non-volatile memory 104 every time an address translation is needed can take a relatively-long time and reduce performance of the storage system 100. So, the controller 102 can read all or some of the L2P table from the non-volatile memory 104 and cache it in volatile memory (e.g., RAM 116), as reading from volatile memory is faster than reading from the non-volatile memory 104.

Because volatile memory, such as DRAM, is relatively expensive, it may be preferred to store L2P tables as space-efficiently as possible to minimize the number of DRAM devices needed in the storage system 100. However, a space-versus-performance tradeoff can be encountered when using an error correction code (ECC) to protect the data stored in the volatile memory. More specifically, because volatile memory can be lossy, data stored in volatile memory can inadvertently be corrupted (e.g., by stray radiation). To protect against such data loss, the controller 102 or a separate ECC engine in the storage system 100 can generate ECC bits for data stored in the volatile memory. For example, a single-error-correct, double-error-detect error correction code (SECDED ECC) can be used. However, the amount of data stored and the size of the ECC needed to protect the data can vary depending on the configuration of the storage system 100, and different configurations can result in different storage space and performance tradeoffs.

The following examples illustrate different configurations and their storage space and performance tradeoffs. It should be noted that the "performance" discussed herein is somewhat simplified for brevity purposes and does not describe, for example, performance complexities introduced by various DRAM device characteristics. It should also be noted that the following configurations are merely examples, and other configurations can be used. So, details of these configurations should not be read into the claims unless expressly recited therein.

These examples will be discussed in terms of a "codeword." As used herein, a "codeword" refers to a data payload and error correction code (ECC) generated from the data payload. In these examples, the data payload comprises entries of the L2P table (referred to herein as "L2P table entries" or "L2P entries"), and the ECC is generated (e.g., by the controller 102 or separate ECC engine) based on the data payload. When the codeword is read from the volatile memory, the ECC is used to check the integrity of the data to detect and possibly correct an error. In general, higher space efficiency (i.e., greater percentage of the volatile memory used for data versus ECC) generally reduces the overall cost for the volatile memory. In some storage systems (e.g., enterprise SSDs), the majority of volatile memory accesses are comprised of fully-random L2P entry reads or writes (i.e., the volatile memory workload is mostly small random accesses).

In these examples, 32 bits of data are used for each L2P table entry, and multiple L2P table entries or fractions of L2P table entries can be protected with one ECC. Further, the volatile memory has a minimum "burst size" that defines the smallest read or write transaction. In the below illustrations, the burst size is 16 "beats" (e.g., the smallest read/write transaction is 16 times the width of the bus between the volatile memory and the controller 102). So, for example, a single burst is 80 bytes for a five-byte-wide bus and 64 bytes for a four-byte-wide bus.

One common configuration (shown in FIG. 4) is a "4+1" codeword (i.e., a codeword with four bytes of data and one byte of ECC protecting the data) with a five-byte (40 bit) wide bus. The efficiency of this codeword is relatively low (80%), as only four of the five bytes in the codeword are used to store data. This means that 20% more volatile memory capacity would need to be added to the storage system 100 due to this ECC inefficiency.

Figure 4:
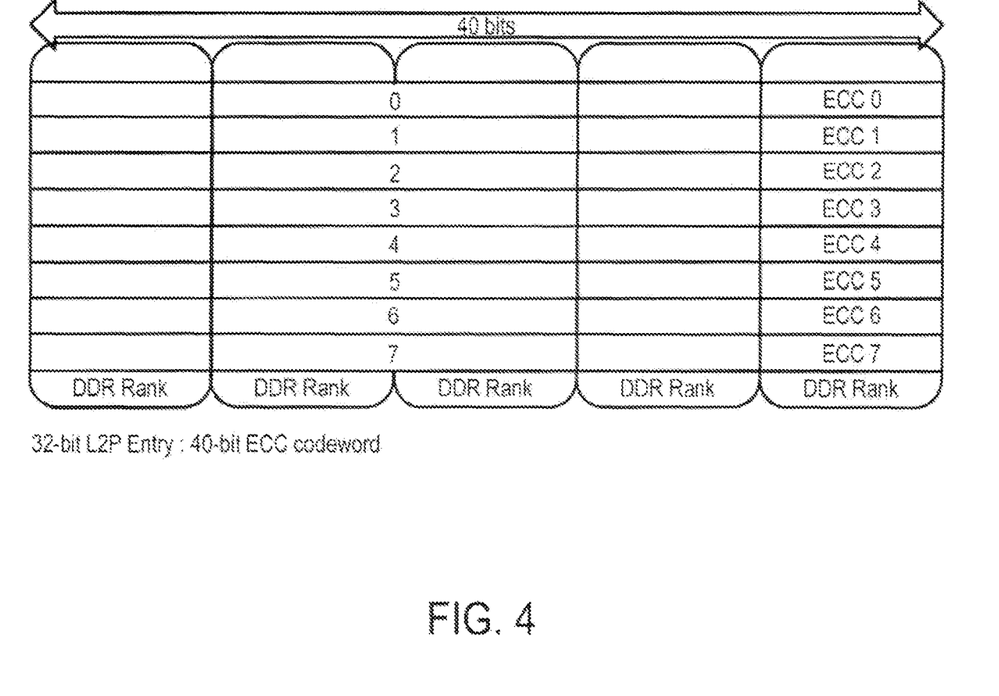
FIG. 4 is an illustration of a codeword of an embodiment in which four bytes of data are protected by one byte of error correction code.

In this configuration, one L2P entry is encapsulated in a single codeword (because 32 bits (four bytes) of data are used for each L2P table entry in this example). So, five bytes need to be read from the volatile memory in order to read one L2P entry, and five bytes need to be written to write one L2P entry. So, no read-modify-write (RMW) operation is required since each codeword is completely overwritten when one L2P entry is updated. Because the burst size is 80 bytes (16 times the width of the bus width of five bytes), the five-byte codeword is a single burst transaction, meaning the DRAM random access performance is relatively high.

Figure 5:
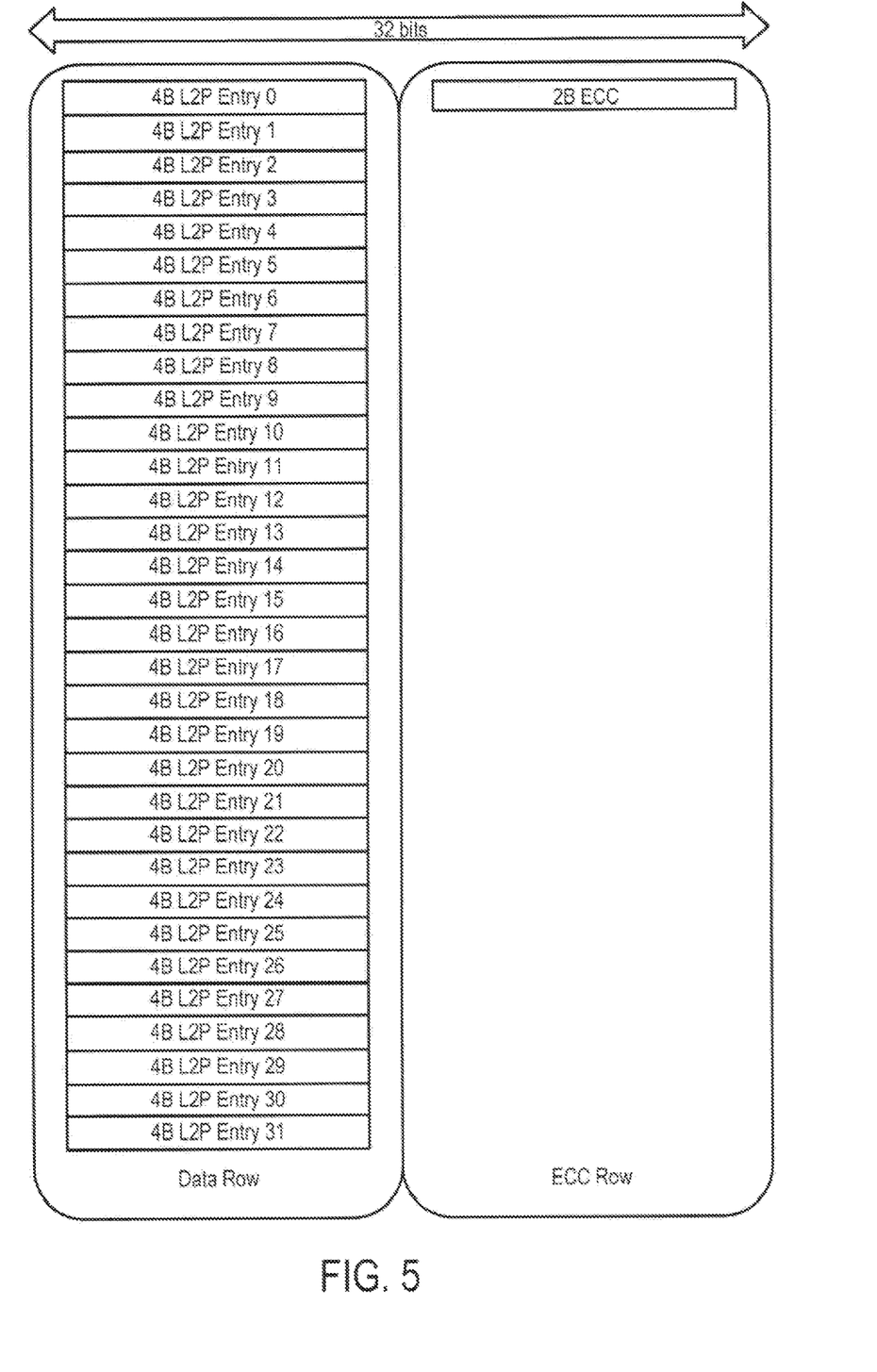
FIG. 5 is an illustration of a codeword of an embodiment in which 128 bytes of data are protected by two bytes of error correction code.

FIG. 5 is an illustration of another codeword of an embodiment: a "128+2" codeword (i.e., a codeword with 128 bytes of data and two bytes of ECC protecting the data) with a four-byte (32 bit) wide bus. In this configuration, 32 L2P entries are encapsulated in a single codeword. The efficiency of this codeword is relatively high (98.5%), as 128 of 130 bytes in the codeword are used to store data. In contrast with the 4+1 codeword, this codeword avoids the need to add 20% more volatile memory capacity to the storage system 100 due to this ECC inefficiency. For example, in an eight terabyte (TB) drive, the storage system 100 can use eight gigabytes (GiBs) of raw DRAM for a 128+2 codeword versus 10 GiBs of raw DRAM for a 4+1 codeword.

In this configuration, 130 bytes need to be read from the volatile memory in order to read one L2P entry, and 130 bytes need to be written to write one L2P entry. However, since only four bytes are changed in the codeword when one L2P entry is written, a 130-byte read for a read-modify-write operation is required per L2P entry update. Given the volatile memory minimum burst size of 64 bytes, this 130-byte read requires three burst transaction for a read and six burst transactions for a write. This means the volatile memory random access performance for the 128+2 codeword is relatively low compared to the 4+1 codeword; hence, the tradeoff between storage space and performance.

The following paragraphs describe one particular implementation in which an application-specific integrated circuit (ASIC) (e.g., the controller 102) is used to provide a hardware assist to vary L2P indication table data stored in the data payload of a codeword. These embodiments can be used alone or in combination with the below embodiments (e.g., to expand the enhanced performance solution for high-capacity drives). It should be understood that the details presented below are merely examples and should not be read into the claims unless expressly recited therein.

Currently in high-capacity enterprise SSDs, the sheer size of the SSD drives causes an expansion of the L2P table in order to address the amount of physical NAND. Enterprise SSDs, by default, use a four kilobyte (K) indirection size for the L2P table. So, each four-kilobyte unit in the NAND has one entry in the L2P table. For example, an eight TB SSD contains more than eight GiBs of physical NAND (due to over-provisioning in the NAND die), and 32-bit entries in the L2P table are needed to locate a single four kilobyte logical page within that physical NAND address space (i.e., larger than 8 GiB but less than the 16 GiB physical NAND). However, a 16 TB drive would need 33-bit L2P entries, a 32 TB drive would need 34-bit L2P entries, and a 64 TB drive would need 35-bit L2P entries. This, therefore, requires more DRAM to hold the L2P table, which takes up the majority of the DRAM capacity. The challenge is to avoid increasing the amount of DRAM needed in the high capacity drive since that adds cost and power.

In some storage systems, 20% additional DRAM is needed to hold ECC and/or extra L2P table space. In these systems, a variable L2P entry size is used, where the L2P entry could be 32 or 33-36 bits to accommodate high capacity SSDs, and DRAM codewords reduce their ECC size to compensate. Specifically, a 32-bit entry would use a 4+1 codeword with 20% ECC overhead, but a 33-36 bit entry would use a 9+1 codeword (each nine-byte codeword would store two 36-bit L2P entries). So, even though there is only 10% ECC overhead, there is also 10% overhead to hold the expanded L2P entries; thus, a 20% overhead overall. This, therefore, results in a 20% additional DRAM cost and power in these high-capacity drives and also results in using a 40-bit DQ (data pins) for a double-data-rate (DDR) bus, which can add some ASIC cost as well (versus a 32-bit DQ scheme, which has 12 fewer ASIC pins).

Figure 6:
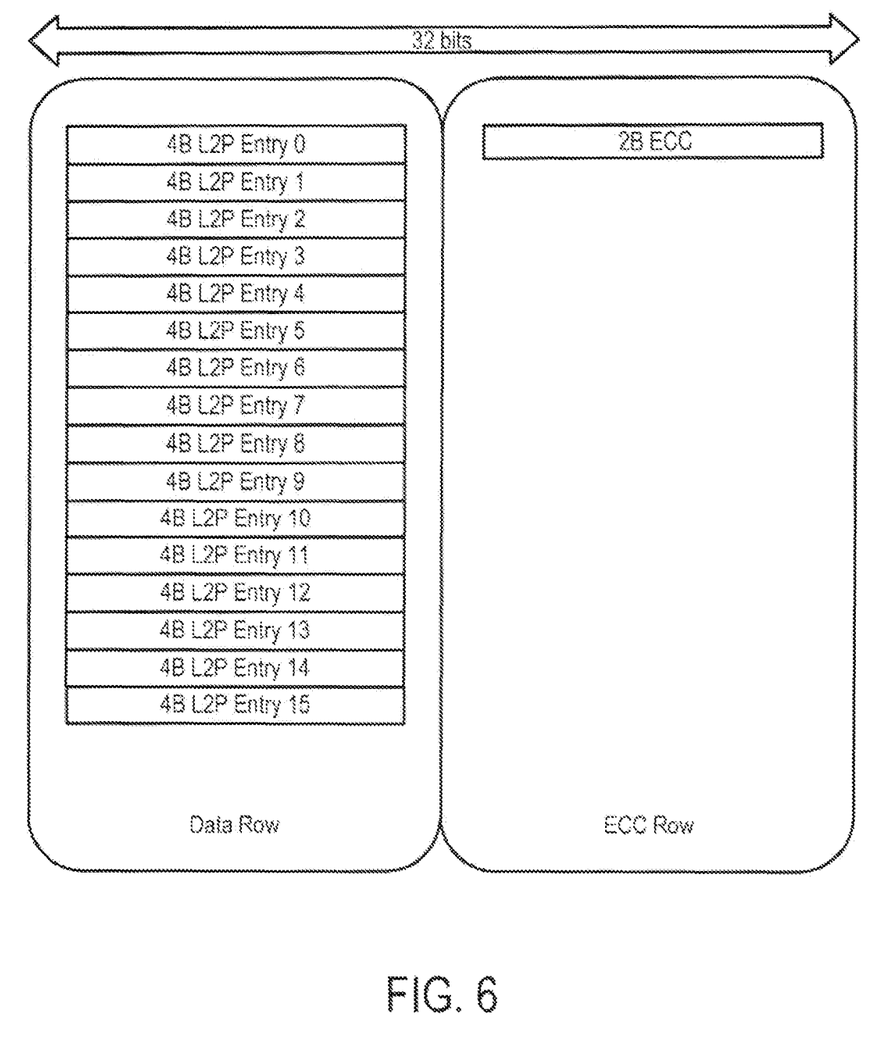
FIG. 6 is an illustration of a codeword of an embodiment in which 64 bytes of data are protected by two bytes of error correction code.

As another option, a 128+2 codeword with 32-bit L2P entries and a 32-bit DQ DDR bus (FIG. 6) can remove the 20% cost/power adder for drives up to eight TBs. However, such codewords may not work for high-capacity drives, such as 16-64 TB drives, if they do not use 32-bit L2P entries. Another issue with a 128+2 codeword is that in enterprise SSD use cases, which are truly random workloads, the accesses to write/update an L2P entry trigger an additional read-modify-write read from the volatile memory. For example, when an enterprise SSD updates an L2P entry, it does a read of just that L2P entry to get the previous physical address (e.g., a 32-bit DRAM read which means the ECC engine has to read an entire 128+2 codeword to get a four-byte entry from inside it. Then, it writes just that L2P entry (e.g., a 32-bit write). But since the DRAM codeword payload is 128 bytes, the ECC engine has to read the entire 128+2 codeword, modify four bytes inside it, regenerate the two-byte ECC, and then write the entire 128+2 modified codeword. This means that just one update of an L2P entry does two codeword reads and one codeword write. This additional read for read-modify-write operation has a major impact on the DRAM input-output operations per second (IOPS) limit for the 100% random-write workload.

To address these issues, the following paragraphs provide embodiments to enhance the existing DDR 32-bit DQ inline-ECC (IECC) scheme so that it supports enterprise high-capacity drives. The current 32-bit DQ IECC scheme uses a 128+2 codeword, and the following embodiments to add an ASIC hardware assist (e.g., through the controller 102) to this to vary the L2P indirection table data that is stored within the 128-byte payload of the codeword. As discussed above, as the size of each L2P entry (that maps a user four kilobyte LBA range to a physical NAND location) increases (e.g., for 16-64 TB drives, L2P entries that are 33/34/35 bits each are needed).

It should be noted that the examples set forth below are for an assist outside of the IECC engine, but it they can be implemented within the IECC engine as well. Some controller ASICs currently have a hardware assist called the L2PM engine that manages all accesses to the L2P table in DRAM. So, whenever firmware requests an update of a specific L2P table entry from the L2PM engine, it automatically reads the current L2P entry from DRAM and then writes the new L2P entry into DRAM (and it is currently not aware of the internal DRAM codeword structure).

The following embodiments can be used to enhance this L2PM engine to be aware of the 128+2 codeword structure and vary the number of L2P entries it expects in each 128-byte payload. For example, the variation can be as follows: 32 entries per codeword for 32-bit L2P entries, 31 entries per codeword (for 16 TB drives at four kilobyte indirection) for 33-bit L2P entries, 30 entries per codeword for 32 TB drives at four kilobyte indirection for 34-bit L2P entries, and 29 entries per codeword for 64 TB drives at four kilobyte indirection for 35-bit L2P entries.

To enable this, the L2PM (e.g., the controller 102) can calculate which DRAM codeword contains the specified L2P entry, read the entire 128-byte codeword payload from the IECC engine, extract a single 32-35 bit entry to get the previous address, modify the 32-35 bit entry with the address, and write the entire 128-byte payload back to the IECC engine to be written to DRAM. Because it is writing an entire aligned codeword payload, there is no read-modify-write operation within the IECC engine, thus improving DRAM performance for enterprise workloads.

Figure 7:
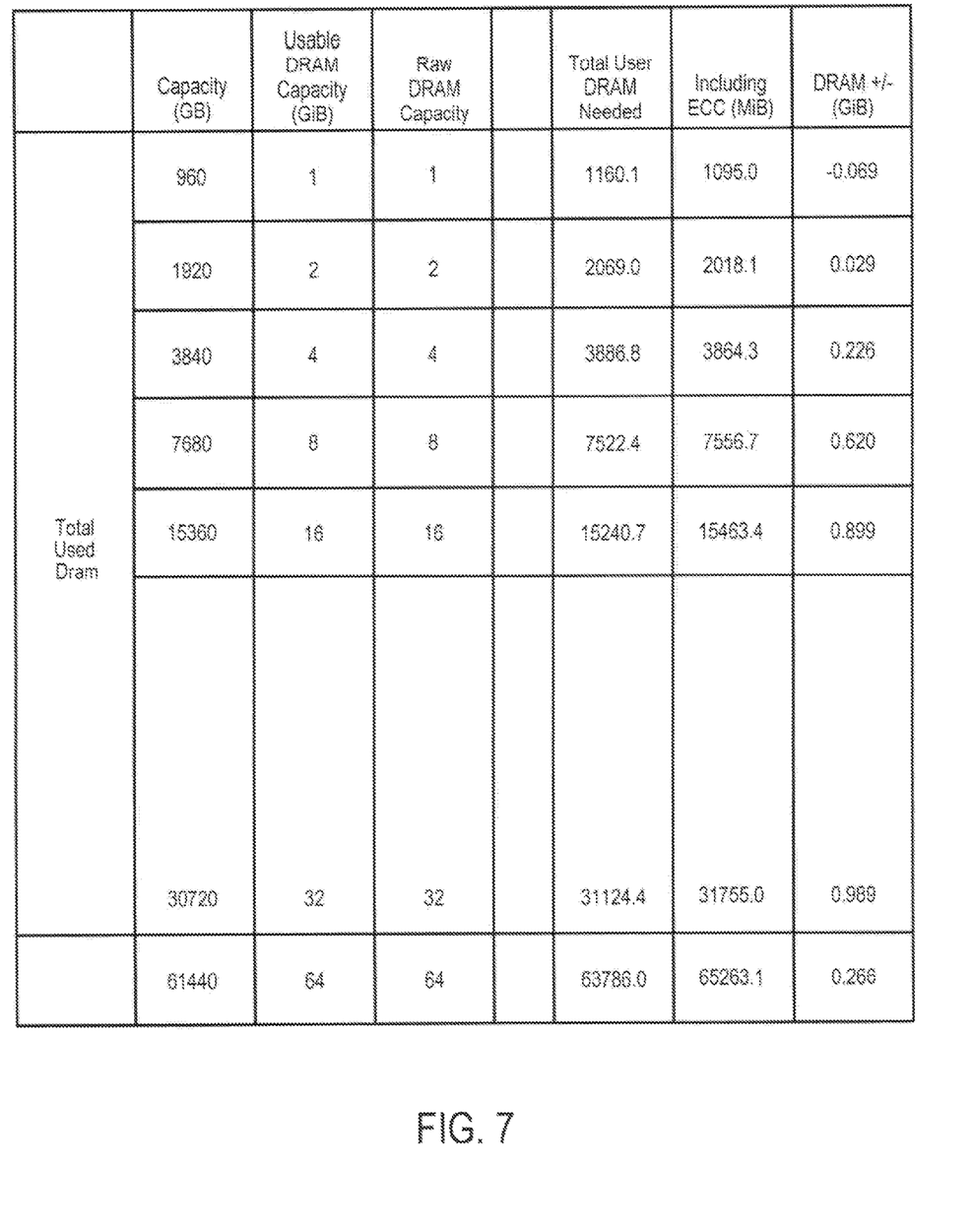
FIG. 7 is a table of an embodiments showing DRAM usage under a number of scenarios.

The above scheme does mean there are some spare (unused) bits within the DRAM codeword for 33-35 bit mode, which uses a small amount of DRAM capacity. Modelling was performed of the various objects stored in DRAM to confirm this scheme would physically "fit" within the reduced DRAM size. FIG. 7 shows the results of this modelling and shows that this scheme will not fit into an enterprise one TB drive but does fit into all the other capacities all the way up to a 64 TB drive with 64 GiB of DRAM. Note for that 64 TB drive case, to make this fit, some DRAM overhead was reduced by doubling the size of the L2P table "chunks" for logging, which halves the size of the DRAM table used to track the contents of the log on NAND. This means some small reduction in random write performance on this drive to enable this cost-reduced DRAM scheme to fit, but this is an acceptable trade-off.

With high-capacity drives (i.e., 33-35 bit L2P entries), the hardware assist can also manage extracting 32 (or 64, 128, etc.) sections of the L2P table for L2P logging to NAND. The L2P NAND logging system saves portions of the L2P table in terms of a modulo 32 number of L2P entries (e.g., 32 (or 64, etc.) entries per log save). This means with high-capacity drives, saving one 32 entry section of the L2P table can involve two DRAM 128+2 codewords each. So, the L2PM hardware assist can automatically read the required DRAM codewords (i.e., read a 256-byte payload, if necessary) and return just the 32 L2P entries for logging. It will also do hardware assist for the reverse where, on boot, the saved L2P table is restored to DRAM in 32 (or 64, etc.) entry chunks. The L2PM hardware assist can take, for example, a 32-entry chunk of a L2P table read from NAND and then write that into two DRAM codewords as needed (performing read-modify-write) since it will only update 32 L2P entries out of the 66 (or 68 or 70) entries contained in the two codewords. An alternative scheme to this hardware assist for L2P logging or L2P table rebuild on boot is that the firmware can change the granularity of the L2P table chunks, so they match the entries per DRAM codeword. For example, with 33-bit entries, the L2P table chunks can be 31 entries; however, this may add significant firmware complexity to implement (versus the hardware assist solution that can be almost transparent to firmware).

There are many advantages associated with these embodiments. For example, these embodiments can be used to save 20% of DRAM cost and power on high-capacity drives (e.g., 16-64 TB drives). This is a significant cost savings per drive. For example, a 32 TB drive would now have 32 (instead of 40) GiBs of DRAM, and removing that 8 GiB of DRAM saves about $32/drive, at current pricing. Further, the fact that these embodiments inherently remove the need for the extra read-modify-write read operation for an L2P entry update also means the usable DRAM performance goes up and can achieve user random write performance targets through a single 32-bit DQ DDR bus. FIG. 7 is a table of an embodiments showing DRAM usage under a number of scenarios.

Figure 8:
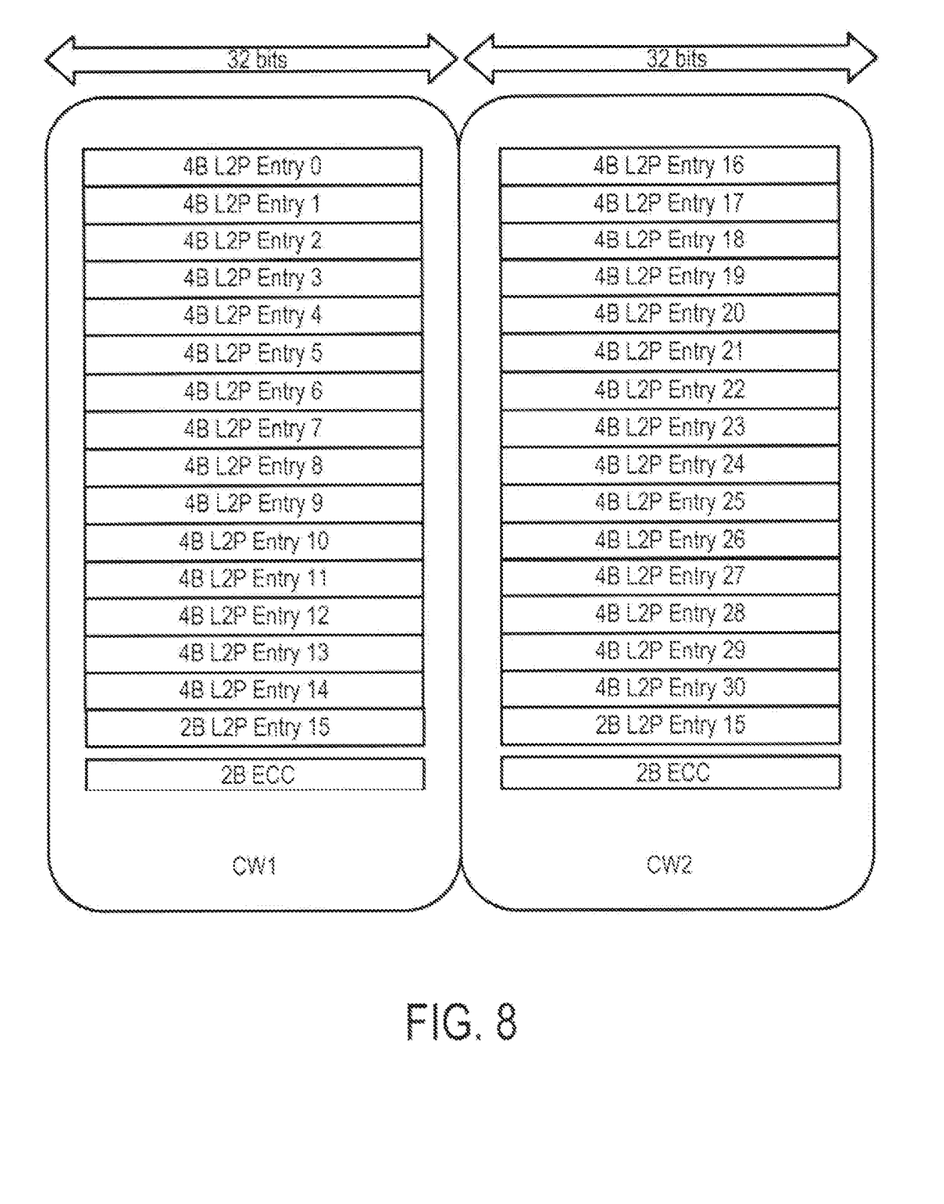
FIG. 8 is an illustration of two codewords of an embodiment in which each codeword comprises 62 bytes of data protected by two bytes of error correction code.

Other embodiments can be used. For example, the following embodiments provide a codeword that better optimizes the balance between storage space versus random-access write performance. As shown in FIG. 8, in this embodiment, a 62+2 codeword with a four-byte-wide data bus is provided. In this codeword, 62 bytes of data are protected by a two-byte ECC. Here, a single codeword encapsulates 15 complete L2P entries plus half of an additional L2P entry. This results in one L2P entry being split between two consecutive codewords (Entry 15 in FIG. 8). (It should be noted that, in other embodiment, the partial entry can be split among more than two codewords.) The space efficiency is relatively high (96.9%), as 62 of 64 bytes in the codeword are used to store data. Even though this is slightly less efficient than the 128+2 codeword, the codeword still fits into the same physical volatile memory (i.e., eight GiBs for an eight TB drive), so it is the same cost For the codeword, the performance is moderate. For the 15 complete L2P entries encapsulated in a single codeword, 64 bytes need to be read from the volatile memory in order to read one L2P entry, and 64 bytes are written to write one L2P entry. However, since only four bytes are changed in the codeword, an additional 64-byte read for read-modify-write is required per L2P entry update. For the L2P entry that is split between two codeword, 128 bytes need to be read from volatile memory in order to read a single L2P entry, and 128 bytes are written to write that one split L2P entry. However, since only two bytes in each codeword changes, two additional 64 byte reads for read-modify-write are required per split L2P entry update. Thus, performance is lower for L2P entries that are split between two codewords.

Given the volatile memory minimum burst size, this 64-byte codeword (with read-modify-write) for the 15 complete L2P entries becomes a one-burst transaction for a read and a two-burst transaction for a write. For the split L2P entry across two codewords, this becomes a two-burst transaction for a read and a four-burst transaction for a write. This means the volatile memory access performance is better than the 128+2 codeword. Random write workloads generally conform to a uniform random distribution of logical block addresses when mapped onto a 62+2 codeword. Thus, the average performance is dominated by that for accessing one of the 15 complete L2P entries encapsulated in a single codeword.

It should be noted that it is possible to eliminate the additional overhead of read-modify-write needed when updating one L2P entry if the storage system 100 reads the original L2P entry first (to mark that old logical page that is being overwritten as invalid data for garbage collection). When the entire codeword is read (to read one L2P entry prior to update), the entire codeword can be cached in the controller 102, so that when the L2P update is performed to record the new logical page location, the controller 102 can modify one L2P entry in the cached codeword and then write the entire modified codeword to volatile memory. Given that the controller 102 reads and writes entire codewords anyway, the amount of data read from and written to volatile memory is unchanged except the caching has eliminated the need for a read-modify-write operation.

As noted above, there are many advantages of using a 62+2 codeword over a 4+1 or 128+2 codeword. For example, the 62+2 codeword has a small efficiency reduction, but this actually makes no difference to the physical volatile memory required; so, the cost is the same. The 62+2 codeword (without the read-modify-write caching) improves drive random write performance by 12% because it only uses one burst for the majority of L2P accesses versus three bursts for the 128+2 codeword. Further, the 62+2 codeword has a substantial space efficiency benefit, which means it uses 20% less raw volatile memory space than a 4+1 codeword. Additionally, a 62+2 codeword (without the read-modify-write caching) has a random access performance reduction when compared to a 4+1 codeword (due to the need for a read-modify-write operation). But with the addition of read-modify-write caching, both codewords use a single burst access for the majority of L2P accesses, but the 62+2 codeword has a slightly-lower random-access performance due to the one-out-of-sixteen L2P accesses that require two bursts.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a non-volatile memory;
   a volatile memory; and
   means for storing first and second codewords in the volatile memory, each of the first and second codewords comprising a data payload and an error correction code generated from the data payload;
   wherein the data payload of the first codeword comprises a first logical-to-physical address table entry read from the non-volatile memory and a portion of a second logical-to-physical address table entry read from the non-volatile memory; and
   wherein a data payload of the second codeword comprises a remainder of the second logical-to-physical address table entry.

2. A storage system comprising:
   a non-volatile memory;
   a volatile memory; and
   a controller configured to store first and second codewords in the volatile memory, each of the first and second codewords comprising a data payload and an error correction code generated from the data payload;
   wherein the data payload of the first codeword comprises a first logical-to-physical address table entry read from the non-volatile memory and a portion of a second logical-to-physical address table entry read from the non-volatile memory; and
   wherein a data payload of the second codeword comprises a remainder of the second logical-to-physical address table entry.

3. The storage system of claim 2, wherein the data payload of each of the first and second codewords comprise 62 bytes, and wherein the error correction code of each of the first and second codewords comprise two bytes.

4. The storage system of claim 2, wherein each of the first and second codewords are configured to store a non-integer number of logical-to-physical address table entries.

5. The storage system of claim 4, wherein each of the first and second codewords is configured to store 15 complete logical-to-physical address table entries and half of an additional logical-to-physical address table entry.

6. The storage system of claim 2, wherein the error correction code comprises a first error correction code in the first codework and a second error correction code in the second codeword, and wherein the second logical-to-physical address table entry is partially protected by the first error correction code in the first codeword and partially protected by the second error correction code in the second codeword.

7. The storage system of claim 2, further comprising a four-byte-wide bus between the controller and the volatile memory.

8. The storage system of claim 2, wherein reading the first logical-to-physical address table entry from the volatile memory requires a single minimum read transaction, and wherein reading the second logical-to-physical address table entry from the volatile memory requires two minimum read transactions.

9. The storage system of claim 2, wherein updating the first logical-to-physical address table entry in the volatile memory requires two minimum write transactions, and wherein updating the second logical-to-physical address table entry in the volatile memory requires four minimum write transactions.

10. The storage system of claim 9, wherein the four minimum read transactions comprise read-modify-write operations, and wherein updating the second logical-to-physical address table entry in the volatile memory only requires two minimum write transactions in response to read-modify-write caching being used.

11. The storage system of claim 2, wherein the controller is further configured to vary a number of logical-to-physical address table entries in the data payload of the first codeword.

12. The storage system of claim 11, wherein the controller is further configured to vary the number of logical-to-physical address table entries by:
    determining that the first codeword contains a specified logical-to-physical address table entry;
    extracting the specified logical-to-physical address table entry from the data payload of the first codeword to identify a previous address; and
    modifying the specified logical-to-physical address table entry with the previous address.

13. The storage system of claim 2, wherein the non-volatile memory comprises a three-dimensional memory.

14. In a storage system comprising a non-volatile memory and a volatile memory, a method comprising:
    storing a codeword in the volatile memory, wherein the codeword comprises a data portion and an error correction code generated from the data portion, wherein the data portion comprises a complete logical-to-physical address table entry read from the non-volatile memory and a partial logical-to-physical address table entry read from the non-volatile memory; and storing at least one additional codeword in the volatile memory, wherein the at least one additional codeword comprises a remainder of the partial logical-to-physical address table entry.

15. The method of claim 14, wherein the at least one additional codeword comprises at least one additional error correction code, wherein the data payload of each codeword comprises 62 bytes, and wherein the error correction code of each codeword comprises two bytes.

16. The method of claim 14, wherein each codeword is configured to store 15 complete logical-to-physical address table entries and half of an additional logical-to-physical address table entry.

17. The method of claim 14, wherein reading the complete logical-to-physical address table entry from the volatile memory requires a single minimum read transaction, and wherein reading a logical-to-physical address table entry split among codewords requires two minimum read transactions.

18. The method of claim 14, wherein updating the complete logical-to-physical address table entry in the volatile memory requires two minimum write transactions, and wherein updating a logical-to-physical address table entry split among codewords requires four minimum write transactions without read-modify-write caching or two minimum write transactions with read-modify-write caching.

19. The method of claim 14, further comprising varying a number of logical-to-physical address table entries in a data payload of a codeword.

20. The method of claim 19, wherein the number of logical-to-physical address table entries are varied by:
   determining that the codeword contains a specified logical-to-physical address table entry;
   extracting the specified logical-to-physical address table entry from the data payload of the codeword to identify a previous address; and
   modifying the specified logical-to-physical address table entry with the previous address.

\* \* \* \* \*